No. 889,396. PATENTED JUNE 2, 1908.
P. S. O'NEIL.
BRIDLE BIT.
APPLICATION FILED MAY 14, 1906.

Witnesses
C. B. Senden
K. K. Keffer.

Inventor Philip S. O'Neil.
by Ourig & Lane atty's.

UNITED STATES PATENT OFFICE.

PHILIP S. O'NEIL, OF COLO, IOWA.

BRIDLE-BIT.

No. 889,396.　　　Specification of Letters Patent.　　　Patented June 2, 1908.

Application filed May 14, 1906. Serial No. 316,885.

*To all whom it may concern:*

Be it known that I, PHILIP S. O'NEIL, a citizen of the United States, residing at Colo, in the county of Story and State of Iowa, have invented a certain new and useful Bridle-Bit, of which the following is a specification.

The object of my invention is to provide a chain bit designed to be used in training horses, which is so constructed that the bit can be easily removed from the mouth of the animal, and which will be effective in controlling the most unruly animal owing to its construction.

A further object is to provide a bit of this type of simple, durable and inexpensive construction which can be easily and readily attached to the ordinary bridle and substituted for the ordinary straight bit.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1:
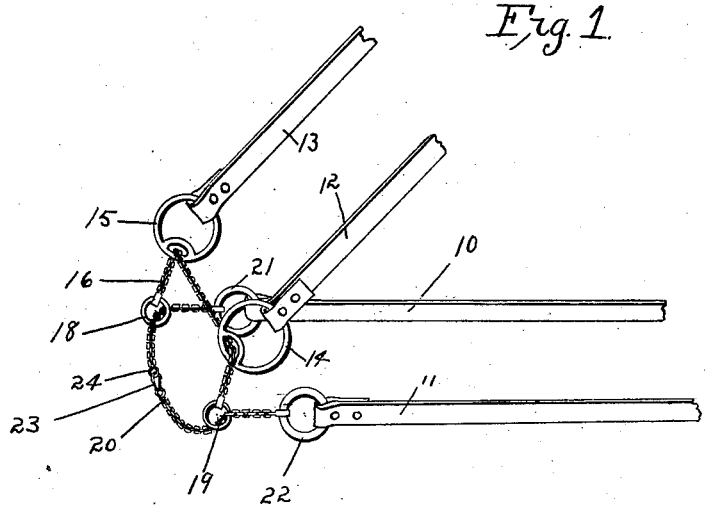
Figure 2:
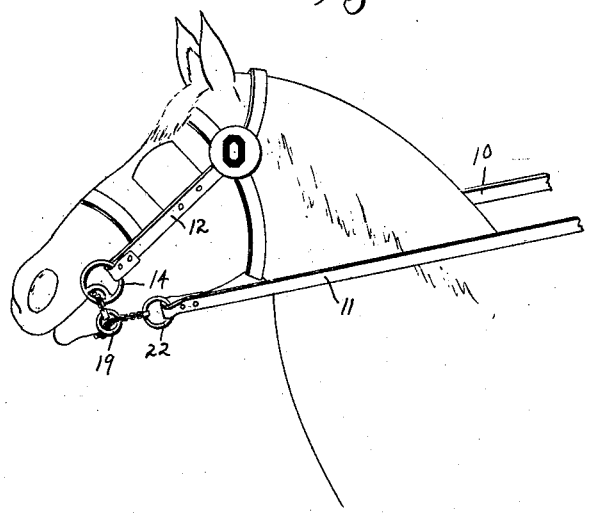

Figure 1 is a perspective view of the bit, showing the way in which it is attached to the bridle straps, and Fig. 2 is a bridle showing my bit attached to it on the head of an animal.

Referring to the accompanying drawings, I have used the reference numerals 10 and 11 to represent the reins, and the reference numerals 12 and 13 to represent the side straps of the bridle. The straps 12 and 13 have the rings 14 and 15 attached to their lower ends, through which the chain 16 is designed to pass, said chain having the rings 18 and 19 at its free end. This chain is designed to be placed in the mouth of the animal and the rings 18 and 19 so arranged that a second chain 20 can be passed through them. On the ends of the chain 20 are two rings 21 and 22 to which the reins 10 and 11 are attached. This chain 20 is designed to be passed beneath the lower jaw of the animal. In the central portion of this chain 20 I have provided a hook 23 and a small ring 24, into which it is designed to be hooked, so that the chain 20 may be easily removed, so that the bridle may be easily taken apart.

In practical use, the bridle is placed upon the horse by placing the rings 14 and 15 on the sides of the mouth of the horse, placing the chain 16 in the mouth of the animal and then placing the chain 20 beneath the lower jaw, whereupon the pulling force exerted upon the reins 10 and 11 causes the chains 16 and 20 to be drawn tightly around the lower jaw of the animal. This serves to very effectively restrain the animal and control its actions.

Having thus described my invention, what I claim and desire to secure by Letters Patent of the United States, therefor is—

1. In a bridle, two side straps, a ring at the lower end of each side strap, a chain passing through said rings and designed to be placed in the mouth of an animal, a ring at each end of said chain, a second chain designed to pass beneath the lower jaw of the animal, which passes through the rings at the ends of the chain to be placed in the mouth of the animal, rings at the ends of said second chain to which reins are designed to be attached, and means for detachably connecting the chain that is designed to pass beneath the animal's jaw.

2. In a bridle, two side straps, a ring at the lower end of each side strap, a chain passing through said rings and designed to be placed in the mouth of an animal, a ring at each end of said chain, a second chain designed to pass beneath the lower jaw of the animal, which passes through the rings at the ends of the chain to be placed in the mouth of the animal, rings at the ends of said second chain to which reins are designed to be attached, the chain that is designed to pass beneath the animal's jaw being separable at its central portion, a hook on one end thereof, and a ring on the other end to be detachably connected to said hook.

P. S. O'NEIL.

Witnesses:
　JAS. McCOY,
　D. G. WELTY.